United States Patent
Chen

(10) Patent No.: US 7,937,050 B2
(45) Date of Patent: May 3, 2011

(54) BUILT-IN TESTING SIGNAL WIRELESS COMMUNICATION APPARATUS AND TESTING METHOD THEREOF

(75) Inventor: Tzung-Ming Chen, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1009 days.

(21) Appl. No.: 11/696,193

(22) Filed: Apr. 4, 2007

(65) Prior Publication Data

US 2007/0238422 A1    Oct. 11, 2007

(30) Foreign Application Priority Data

Apr. 7, 2006   (TW) .............................. 95112416 A

(51) Int. Cl.
*H03C 1/62*   (2006.01)
(52) U.S. Cl. ................ 455/115.1; 455/114.2; 455/127.1
(58) Field of Classification Search ............... 455/115.1, 455/114.2, 127.1
See application file for complete search history.

(56) References Cited

U.S. PATENT DOCUMENTS

| | | | |
|---|---|---|---|
| 6,603,810 B1 * | 8/2003 | Bednekoff et al. ........... | 375/228 |
| 6,816,987 B1 | 11/2004 | Olson | |
| 7,239,849 B2 * | 7/2007 | Bereza et al. .............. | 455/67.14 |
| 2002/0011856 A1 | 1/2002 | Huang | |
| 2002/0132580 A1 | 9/2002 | Buer | |
| 2005/0159130 A1 | 7/2005 | Yang | |

FOREIGN PATENT DOCUMENTS

| | | |
|---|---|---|
| JP | 4-60474 | 2/1992 |
| TW | 557446 | 10/2003 |
| TW | I229508 | 3/2005 |

* cited by examiner

*Primary Examiner* — Nay Maung
*Assistant Examiner* — Angelica M Perez
(74) *Attorney, Agent, or Firm* — Winston Hsu; Scott Margo

(57) ABSTRACT

A wireless communication apparatus has: a direct current generator, for generating a direct current signal and a transmitter. The transmitter includes: an oscillating signal generator for generating an oscillating signal; a mixer for mixing one of the direct current signal and the transmitting signal with the oscillating signal according to a mode signal and generating a mixed signal; and an amplifying module for amplifying the mixed signal to generate an output signal. When the mode signal is represented that the wireless communication apparatus is under test, the direct current signal is being mixed with the oscillating signal and the mixed signal is a sinusoidal wave. When the mode signal is represented that the wireless communication apparatus is under transmitting, the transmitting signal is being mixed with the oscillating signal and the mixed signal is a modulated signal.

16 Claims, 3 Drawing Sheets

BUILT-IN TESTING SIGNAL WIRELESS COMMUNICATION APPARATUS AND TESTING METHOD THEREOF

BACKGROUND OF THE INVENTION

1. Field of the Invention

The present invention relates to a testing method of a wireless communication apparatus, and more particularly, to a testing method of a wireless communication apparatus with a built-in testing signal.

2. Description of the Prior Art

In common radio frequency communication systems using amplitude modulation (AM), the linearity of the transceiver directly affects the quality of the received signal, which will be distorted by the noise inside or outside of the channel. Since the error-signal rate often increases with the signal distortion caused by non-linearity of the circuit, an external testing signal source is added and an oP1 dB (output 1 dB compression point) is observed when testing the transceiver IC. Please refer to FIG. 1. FIG. 1 is a schematic diagram of delineating the output voltage as a function of the input voltage. In mass-production testing of the radio frequency IC, it is essential but time-consuming to measure the oP1 dB. As shown in FIG. 1, after sinusoidal signals with varied amplitude are inputted into the transceiver IC, the output voltage ($P_{out}$) is then obtained. It takes further calculation to get oP1 dB where the difference in $P_{out}$ is 1 dB. In conclusion, with the fact that input of a sinusoidal signal with a varied voltage is inevitable in measuring $P_{out}$, a new method providing fast and simple measurement is required to decrease the time spent in measurement.

SUMMARY OF THE INVENTION

It is therefore one of the objectives of the present invention to provide a wireless communication apparatus with a built-in testing signal, and a testing method thereof, which will skip signal installation and save time spent in testing to solve the above-mentioned problems.

A wireless communication apparatus is disclosed, the apparatus comprising: a direct current generator, for generating a direct current signal; and a transmitter, coupled to the direct current generator, the transmitter comprising: an oscillating signal generator, for generating an oscillating signal; a mixer, coupled to the oscillating signal generator, for mixing one of the direct current signal and the transmitting signal with the oscillating signal according to a mode signal and generating a mixed signal; and an amplifying module, coupled to the mixer, for amplifying the mixed signal to generate an output signal; wherein when the mode signal is represented that the wireless communication apparatus is under test, the direct current signal is being mixed with the oscillating signal and the mixed signal is a sinusoidal wave; when the mode signal is represented that the wireless communication apparatus is under transmitting, the transmitting signal is being mixed with the oscillating signal and the mixed signal is a modulated signal.

A testing method for application in a wireless communication apparatus is disclosed, the method comprising: generating a direct current signal; generating an oscillating signal; mixing the direct current signal with the oscillating signal to generate a sinusoidal wave; and amplifying the sinusoidal wave and generating an output signal to be tested; wherein the direct current signal, the oscillating signal and the output signal are generated from the wireless communication apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
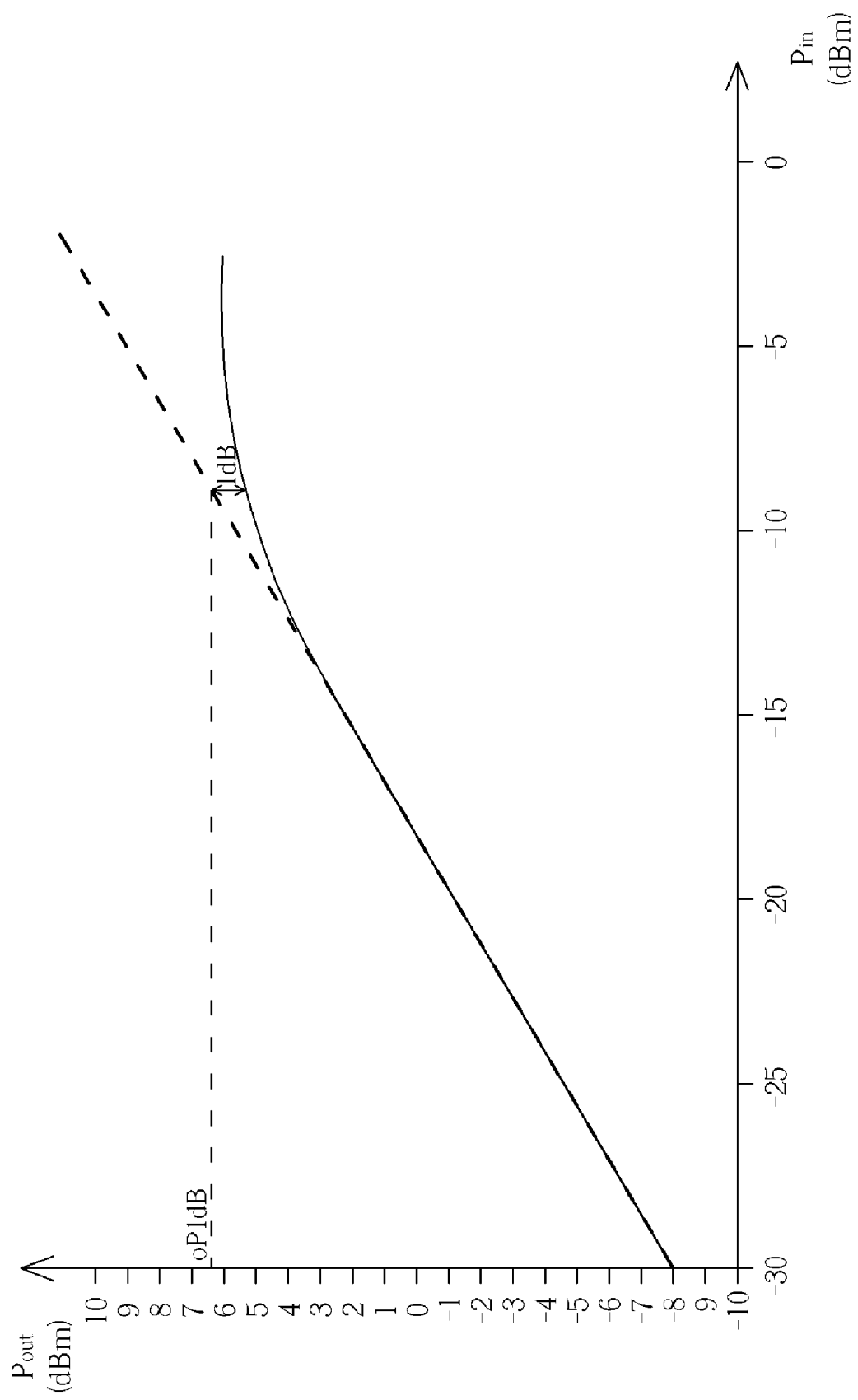
FIG. 1 is a schematic diagram illustrating delineating an output voltage as a function of input voltage.
Figure 2:
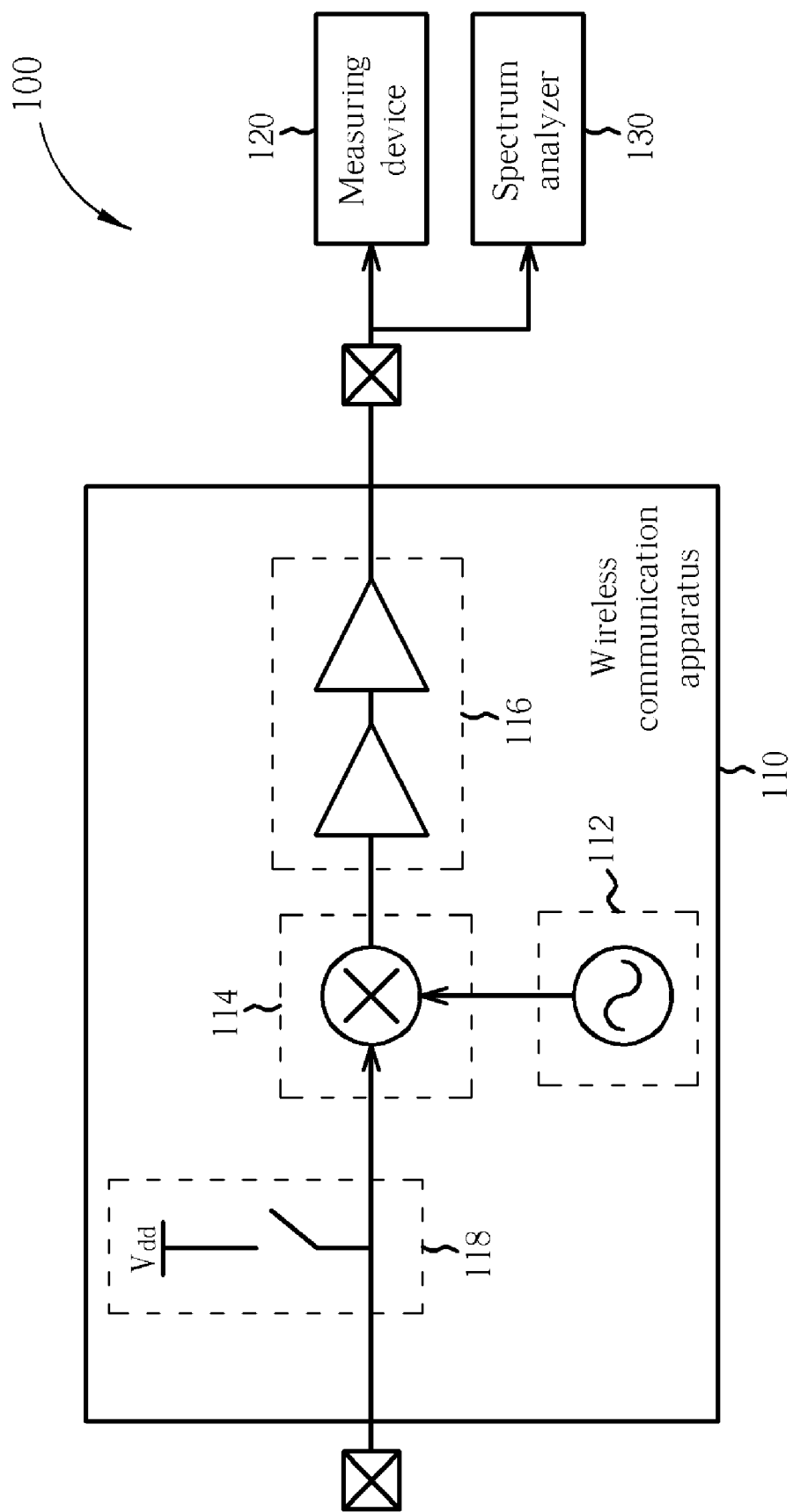
FIG. 2 is a functional block of a testing apparatus according to an embodiment of the present invention.

Please refer to FIG. 2. FIG. 2 is a functional block of a testing apparatus 100 according to an embodiment of the present invention. As shown in FIG. 2, the testing apparatus 100 includes a wireless communication apparatus 110, a measuring device 120 and a spectrum analyzer 130. As known in this field, a wireless communication apparatus is composed of a plurality of elements (a receiver or a transmitter). As shown in FIG. 2, the wireless communication apparatus 110 comprises a frequency synthesizer 112 for generating an oscillating signal, a mixer 114 for mixing input signals to generate a mixed signal, an amplifying module 116 for amplifying an input signal and a DC offset generator 118 for generating a direct current signal, wherein the frequency synthesizer 112, the mixer 114 and the amplify module 116 form a transmitting circuit. The DC offset generator 118 is formed by a switch and controlled by a mode control signal. As the apparatus shown in FIG. 2, when the wireless communication apparatus 110 is under transmitting, the frequency synthesizer 112 outputs an oscillating signal to one end of the mixer 114 and the mode control signal closes the DC offset generator 118. In one embodiment, the mode control signal is logic 1 which is representing the wireless communication apparatus 110 is under transmitting to close the switch. The mixer 114 mixes a transmitting signal with the oscillating signal to generate a modulated signal. Accordingly the modulated signal is amplified by the amplifying module 116 and generates an output signal to be transmitted. On the other hand, when the wireless communication apparatus 110 is under test, the frequency synthesizer 112 outputs an oscillating signal to one end of the mixer 114 and the mode control signal opens the DC offset generator 118 to generate a DC offset (supply voltage Vdd) to the other end of the mixer 114. In one embodiment, the mode control signal is logic 0 which is representing the wireless communication apparatus 110 is under test to open the switch. The mixer 114 mixes the DC signal with the oscillating signal to generate a sinusoidal signal rather than generate a modulated signal, wherein the frequency of the sinusoidal signal is equal to the frequency of the oscillating signal generated by the frequency synthesizer 112. Accordingly, the sinusoidal signal is amplified by the amplifying module 116 and generates an output signal to be tested. The measuring device 120 is coupled to the wireless communication apparatus 100, for measuring if the power of the output signal is sufficient. The wireless communication apparatus 100 is qualified in measuring if the saturate power of the output signal is over the threshold value. According to one embodiment of the present invention, the threshold value could use the output voltage corresponding to the input voltage is 0 dbm as shown in FIG. 1. Moreover, the frequency of the output signal can be further used by the spectrum analyzer 130 to determine whether the frequency of the oscillating signal generated by the frequency synthesizer 112 is correct.

Figure 3:
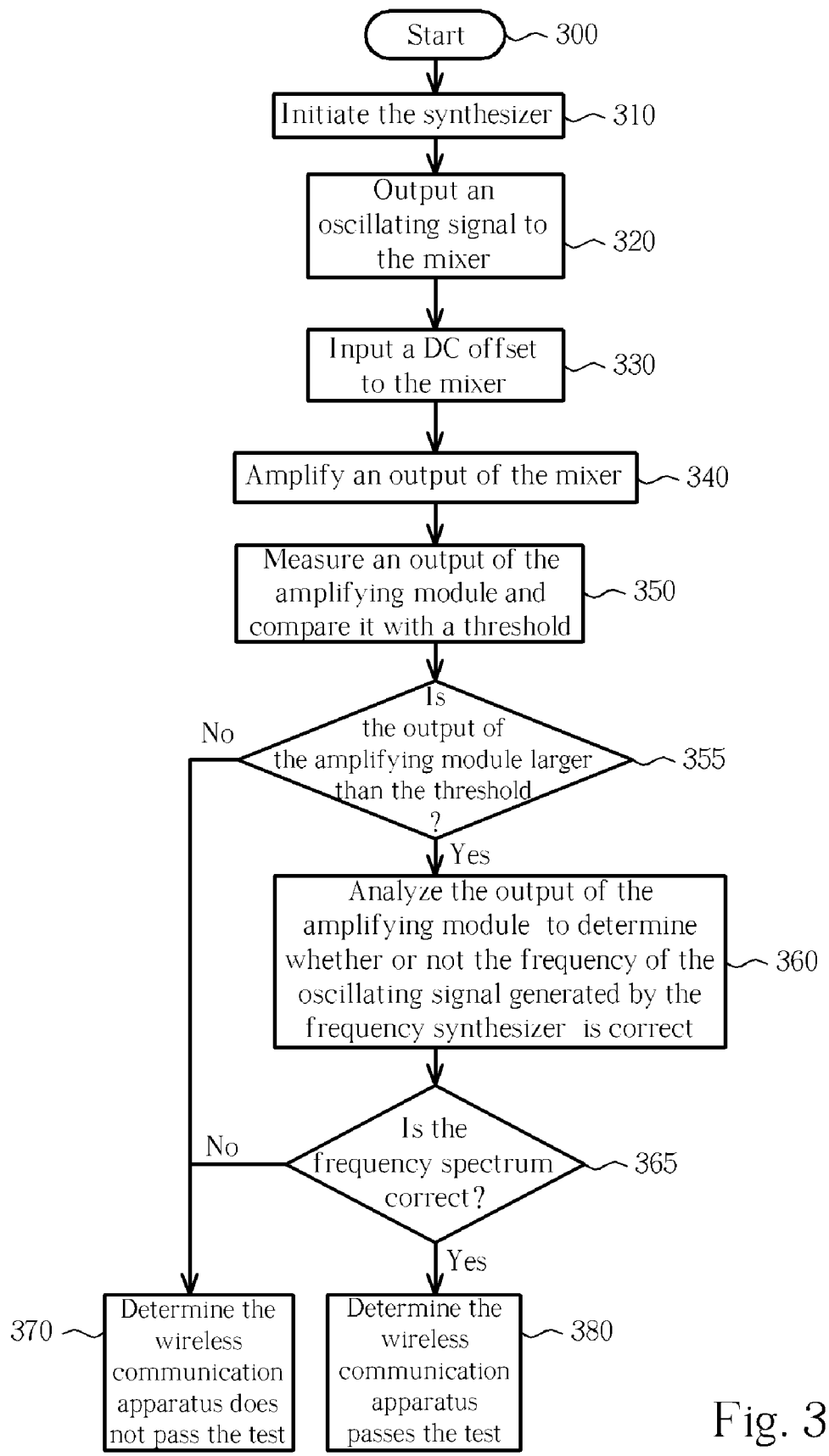
FIG. 3 is a flow chart of a testing method for the wireless communication apparatus according to the present invention.

Please refer to FIG. 3. FIG. 3 shows a flow chart of a testing method for the wireless communication apparatus according to the present invention. The testing method is operated on the testing apparatus 100 mentioned above, and comprises the following steps:

Step 300: Start.
Step 310: Initiate the synthesizer 112.
Step 320: Output an oscillating signal to the mixer 114.
Step 330: Input a DC offset to the mixer 114.
Step 340: Amplify an output of the mixer 114.
Step 350: Measure an output of the amplifying module 116 and compare it with a threshold.
Step 355: Is the output of the amplifying module 116 larger than the threshold? If yes, go to Step 360; otherwise, go to Step 370.
Step 360: Analyze the output of the amplifying module 116 to determine whether or not the frequency of the oscillating signal generated by the frequency synthesizer 112 is correct.
Step 365: Is the frequency spectrum correct? If yes, go to step 380; otherwise, go to step 370.
Step 370: Determine the wireless communication apparatus does not pass the test.
Step 380: Determine the wireless communication apparatus passes the test.

In this embodiment, after the synthesizer 112 is initiated (Step 310), the synthesizer 112 will output an oscillating signal to the mixer 114 (step 320). The DC offset generator 118 generates a DC offset (Step 330) and transmits the DC offset to the other side of the mixer 114. The DC offset is the maximum voltage of the communication system (i.e. Vdd) or the voltage corresponding to the input voltage is 0 dBm as shown in FIG. 1. The usage of the maximum voltage can ensure that the output signal of the wireless communication system is a saturated voltage or a maximum power. In this testing mode, after a large DC offset is generated by the built-in DC offset generator 118 and is transmitted to the mixer 114, the measuring device 120 measures the output signal for determining whether the saturated voltage or the saturated power of the output signal is over a threshold to determine whether the wireless communication apparatus passes the test. As mentioned above, the oP1 dB and saturated power in each of wireless communication apparatus produced from the same process is supposed to be consistent. Therefore, the saturated power of the qualified wireless communication apparatus 100 can be used as the testing threshold for testing other wireless communication apparatuses. The method mentioned here will reduce the testing time and improve the efficiency of testing procedures.

On the other hand, the testing apparatus 100 further comprises a spectrum analyzer 130, for determining the correctness of the frequency spectrum of the oscillating signal generated by the frequency synthesizer 112 (Step 360). Generally speaking, the function of the mixer 114 in a communication system is to transform frequency, that is, signal multiplication. For example, the oscillating signal (i.e. a local oscillating signal) can be used to transform a median frequency signal to a radio frequency signal or transform a median frequency signal to a radio frequency signal. However, in this embodiment, one input end of the mixer 114 is not connected to any external signal source but a DC offset in testing mode, so the frequency of the median signal can be viewed as 0 Hz. That is, even mixing the DC offset with the oscillating signal, the frequency of the mixed signal outputted by mixed 114 is substantially equal to the frequency of the oscillating signal generated by synthesizer 112. As a result, the spectrum shown on the spectrum analyzer 130 is corresponding to the spectrum of the oscillating signal. Therefore it is easy to verify the frequency of the oscillating signal is correct or not by utilizing the spectrum analyzer 130.

The present invention utilizes a built-in DC offset generator to generate the DC testing signal to the mixer 114, so the frequency of the oscillation signal can be verified without any external signal source. With this method, time spent in testing can be reduced. In addition, the determination of the threshold value is not limited to the embodiment mentioned above. Other ways to determine the threshold also lie within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication apparatus for transmitting a transmitting signal, the wireless communication apparatus comprising:
   a direct current generator, for generating a direct current signal; and
   a transmitter, coupled to the direct current generator, the transmitter comprising:
      an oscillating signal generator, for generating an oscillating signal;
      a mixer, coupled to the oscillating signal generator, for mixing one of the direct current signal and the transmitting signal with the oscillating signal according to a mode signal and generating a mixed signal; and
      an amplifying module, coupled to the mixer, for amplifying the mixed signal to generate an output signal;
      wherein when the mode signal is represented that the wireless communication apparatus is under test, the direct current signal is being mixed with the oscillating signal and the mixed signal is a sinusoidal wave; when the mode signal is represented that the wireless communication apparatus is under transmitting, the transmitting signal is being mixed with the oscillating signal and the mixed signal is a modulated signal.

2. The wireless communication apparatus of claim 1, wherein when the wireless communication apparatus is under test, the output power of the output signal is a saturated power of the transmitting signal.

3. The wireless communication apparatus of claim 1, wherein when the wireless communication apparatus is under test, the measured output power of the output signal is compared with a threshold value to determine whether the wireless communication apparatus passes a test.

4. The wireless communication apparatus of claim 1, wherein when the wireless communication apparatus is under test, the measured output frequency of the output signal is referred to determine whether the frequency of the oscillating signal generated from the oscillating signal generator is correct.

5. The wireless communication apparatus of claim 1, wherein when the wireless communication apparatus is under test, the output frequency of the output signal is substantially equal to the frequency of the oscillating signal.

6. The wireless communication apparatus of claim 1, wherein the direct current signal is a supply voltage of the wireless communication apparatus.

7. The wireless communication apparatus of claim 1, wherein the direct current generator comprises a switch, one end of the switch receives the direct current signal, and the switch is controlled by the mode signal.

8. The wireless communication apparatus of claim 1, wherein the amplifying module is a power amplifier.

9. The wireless communication apparatus of claim 1, wherein the wireless communication apparatus is a RF wireless communication device.

10. A testing method, applied to a wireless communication apparatus, the method comprising:
generating a direct current signal;
generating an oscillating signal;
mixing one of the direct current signal and a transmitting signal with the oscillating signal according to a mode signal to generate a mixed signal; and
amplifying the mixed signal to generate an output signal to be tested;
wherein the direct current signal, the oscillating signal and the output signal are generated in the wireless communication apparatus;
wherein when the mode signal is represented that the wireless communication apparatus is under test, the direct current signal is being mixed with the oscillating signal and the mixed signal is a sinusoidal wave; when the mode signal is represented that the wireless communication apparatus is under transmitting, the transmitting signal is being mixed with the oscillating signal and the mixed signal is a modulated signal.

11. The testing method of claim 10, further comprising:
measuring an output power of the output signal; and
comparing the output power of the output signal with a threshold value to determine whether the wireless communication apparatus passes a test.

12. The testing method of claim 10, further comprising: measuring an output frequency of the output signal; and checking the output frequency of the output signal is correct.

13. The testing method of claim 12, wherein the output frequency of the output signal is substantially equal to the frequency of the oscillating signal.

14. The testing method of claim 10, wherein the direct current signal is a supply voltage of the wireless communication apparatus.

15. The testing method of claim 10, wherein the output signal is a sinusoidal wave.

16. The testing method of claim 10, wherein the wireless communication apparatus is a RF wireless communication device.

* * * * *